United States Patent

[11] 3,612,445

| [72] | Inventor | Duan Arthur Phillips<br>123 Marshall St., Kotara Heights, New South Wales, Australia |
|---|---|---|
| [21] | Appl. No. | 773,462 |
| [22] | Filed | Nov. 5, 1968 |
| [45] | Patented | Oct. 12, 1971 |

[54] LIFT ACTUATOR DISC
11 Claims, 3 Drawing Figs.

[52] U.S. Cl. ................................................. 244/12 C, 244/23 C
[51] Int. Cl. .................................................. B64c 29/00
[50] Field of Search ...................................... 244/12 C, 23 C

[56] References Cited
UNITED STATES PATENTS

| 2,718,364 | 9/1955 | Crabtree | 244/12 C |
| 2,927,746 | 3/1960 | Mellen | 244/12 C |
| 2,947,496 | 8/1960 | Leggett | 244/12 C |

*Primary Examiner*—Milton Buchler
*Assistant Examiner*—Steven W. Weinrieb
*Attorney*—McGlew and Toren

ABSTRACT: A machine such as an aircraft in which lift is produced by directing a fluid such as air in a radial direction along the surface of a disc which is rotated about its polar axis.

PATENTED OCT 12 1971 3,612,445

Inventor
Duon Arthur Phillips

BY McGlew & Toren

Attorneys

LIFT ACTUATOR DISC

The present invention relates to a machine capable of deriving lift by the direction of fluid radially along the surface of a disc which is rotated about its polar axis.

While the invention may well be applicable in other fields its principal utility is envisaged in the field of aircraft and for convenience but without limitation of the scope of the invention it will be described as applied to an aircraft.

The invention consists in a machine having a rotatable disc, means to rotate the disc about its polar axis and means to produce a flow of fluid in a radial direction across the surface of the disc whereby a lifting force in the direction of the said polar axis is produced on the disc. In order that the invention may be better understood and put into practice a preferred embodiment of the invention is hereinafter described by way of example with reference to the accompanying drawings in which.

Figure 1:
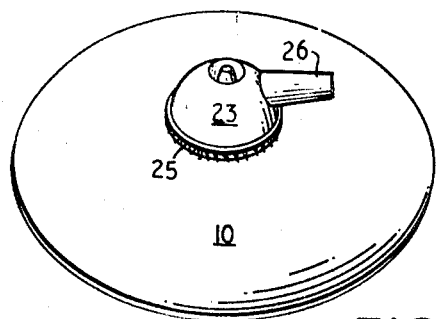
FIG. 1 is a perspective view of an aircraft incorporating the invention.
Figure 2:
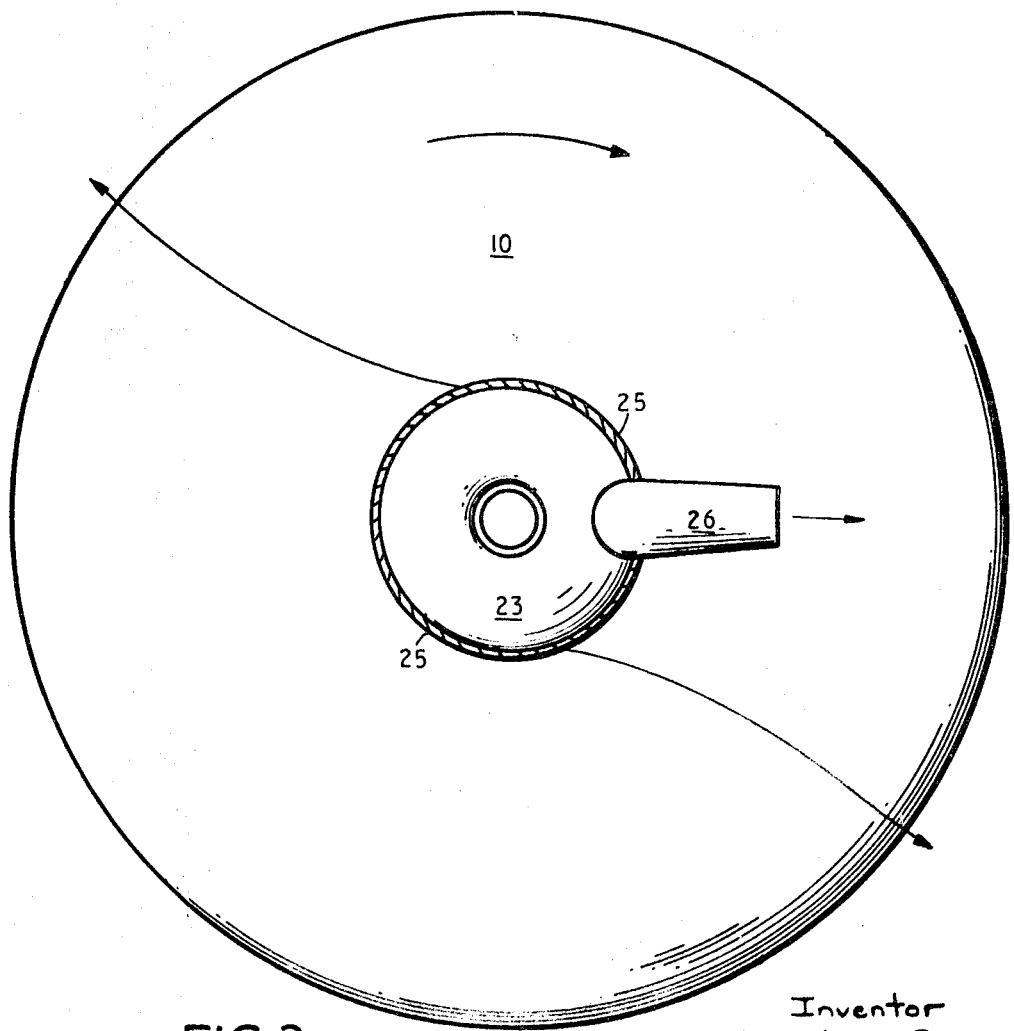
FIG. 2 is a plan view of the aircraft to a larger scale.

The aircraft shown in the drawings consists of a disc 10 having a convexly curved upper surface and a central well 11 by means of which the disc is rotatably supported on the undercarriage 13 through the bearings 12.

A powerplant 14 is arranged in the cylindrical compartment 15 and drives an axial compressor 16 through the shaft 17. The powerplant also rotates the disc 10 through an overrun clutch 17, a centrifugal clutch 18 and a gear box 21. A plate 22 connects the drive to the base of the well 11 of the disc 10.

The compartment 15 supports an annular cabin pod 23 which surrounds the axial compressor 16 and the base of which defines an annular space 24 above the central portion of the disc 10.

Air from the compressor 16 passes along the paths indicated by the arrows through the space 24 where it is directed in a radially outward direction over the surface of the disc. Vanes 25 are arranged in the airstream and the reaction produced acts to prevent rotation of the cabin pod 23.

Lift for the aircraft is produced by the interaction of the flow of air from the space 24 and the rapidly rotating disc 10. The air is picked up along the disc and given an increased velocity radially by virtue of the rotation of the disc giving vectored acceleration to the interfacial air. This results in a low pressure area being formed immediately above the disc and thus the production of lift. The effect is somewhat similar to the Magnus effect.

Figure 3:
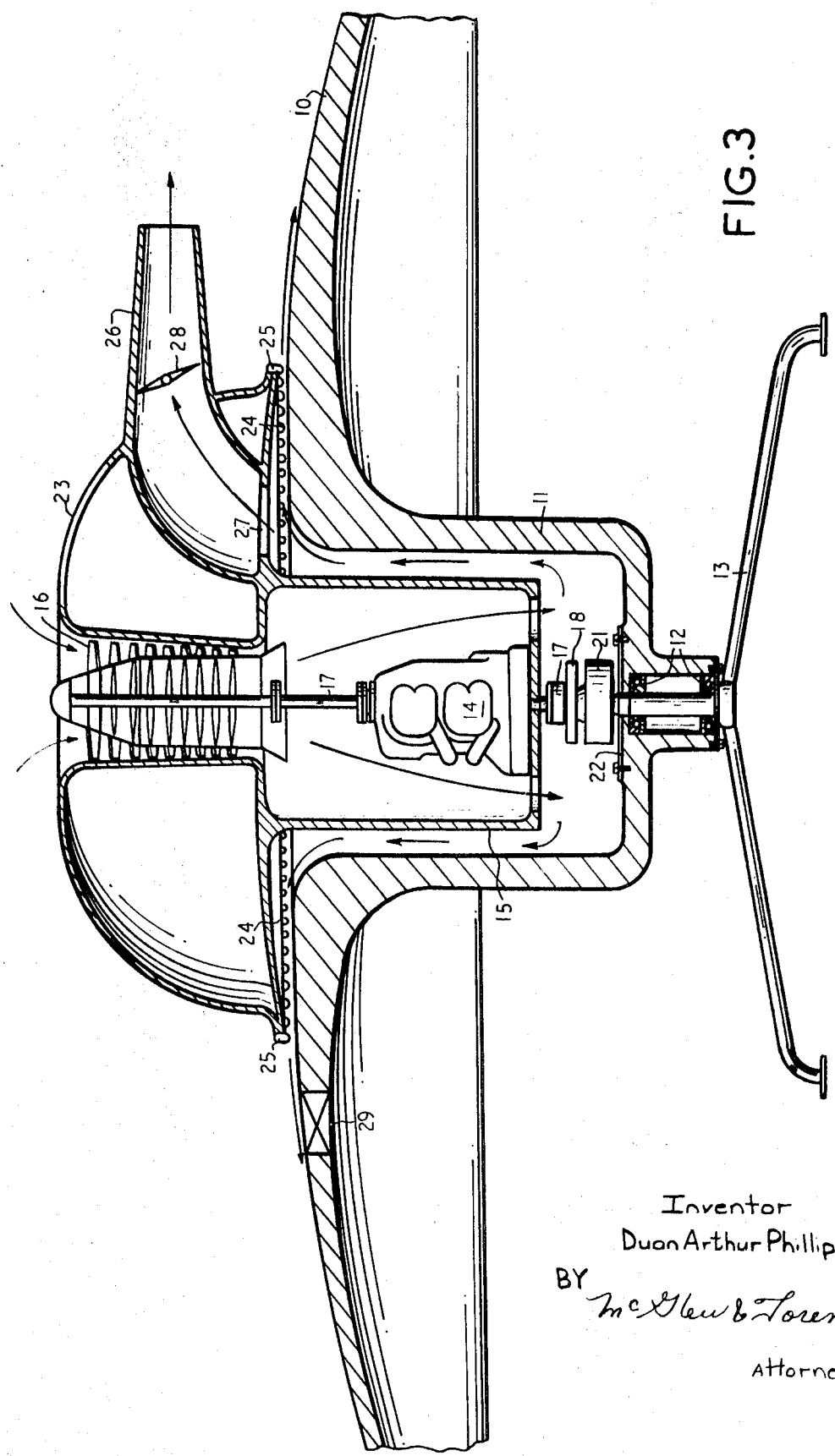
FIG. 3 is a median sectional elevation of the central portion of the aircraft.

In order to produce lateral motion of the craft through the air a jet 26 is provided to which a portion of the air flows through the port 27 and is controlled by the butterfly valve 28. This jet may be replaced by a jet engine or an engine and a propeller. In FIG. 3, the jet 26 is oriented to discharge toward the right side of the figure but control for the purpose of steering may be effected by varying the position of the cabin pod 23 with the jet 26 in respect to its orientation to the disc 10. This may be readily done by regulating the direction of the exit of the air from the space 24 to the surface of the disc 10 such as with suitable controls (not shown) connected to the vanes 25.

A hatch 29 is provided in the disc 10 to facilitate access to the cabin pod 23.

The speed of rotation of the disc and the velocity of airflow over its surface will depend on the size and configuration of the disc and the machine generally.

The present invention is concerned with the general method of producing lift and propelling the machine and constructional and operational details have been included only so far as is necessary for an understanding of the invention.

I claim:

1. An aircraft comprising a rotatable disc having a top surface forming a lifting wing, means to rotate said disc about its polar axis, means near the polar axis of said disc for compressing a fluid, confining means for confining the compressed fluid, inwardly, and guide means on said confining means for directing the confined fluid in a radial direction across the top exterior of said disc.

2. The aircraft as claimed in claim 1 constructed as an aircraft and wherein the fluid is ambient air.

3. The aircraft as claimed in claim 2, wherein means are provided for producing a jet directed at an angle to the axis to produce motion through the air.

4. The aircraft as claimed in claim 2, wherein the surface of the disc over which the fluid flows is curved convexly.

5. The aircraft as claimed in claim 2, including a cabin arranged at the center of the disc and means for preventing rotation of the cabin including a plurality of vanes against which fluid flowing to the surface of the disc reacts.

6. The aircraft as claimed in claim 2, wherein the disc is provided with a central well containing a powerplant arranged to rotate the disc and to drive an axial compressor to produce the said flow of fluid.

7. An aircraft comprising a rotatable disc having a top surface forming a lifting wing, a body rotatably supporting said disc, means near the Polar axis of said disc for compressing a fluid, confining means for confining the compressed fluid inwardly, and guide means on said confining means for directing the confined fluid over the surface of said disc, and a motor connected to said disc to rotate said disc about its polar axis to accelerate the confined fluid air moving over the surface and to produce a low pressure above said disc thereby and to impart lift to said aircraft.

8. An aircraft comprising a rotatable disc having a top surface forming a lifting wing, a motor connected to said disc to rotate said disc, a body mounting said motor and rotatably supporting said disc, means for directing air over the surface of said disc while it is rotated to accelerate the air moving over the surface and to produce a low pressure above said disc thereby and to impart lift to said aircraft, said disc having a central well, said body being located in said well, said motor being supported centrally on said body, a cabin pod defined over said motor, an air compressor driven by said motor and drawing air inwardly centrally above said disc and over said motor and for discharging the air over the surface of said disc, said body having vanes directly above the surface of said disc, through which said air is directed, being oriented to maintain a selected position of said body in respect to said disc.

9. An aircraft, according to claim 8, including a jet nozzle carried on said body and having an inlet located to receive air discharged by said air compressor and to direct it outwardly substantially radially in respect to the axis of said disc but spaced above said disc and oriented in a selected direction dependent upon the position of said body relative to said disc for the purpose of moving said aircraft laterally.

10. An aircraft comprising a rotatable disc having a top surface forming a lifting wing, a motor connected to said disc to rotate said disc, a body mounting said motor and rotatably supporting said disc, means for directing air over the surface of said disc while it is rotated to accelerate the air moving over the surface and to produce a low pressure above said disc thereby and to impart lift to said aircraft, said body being located centrally of said disc, a nozzle member carried by said body having means for directing air outwardly radially in respect to the axis of rotation of said disc, said body including vane means in the path of flow of the air directed over the surface of said disc and being influenced by the air flow for controlling the position of said body relative to said disc and the direction in which the air is directed outwardly from said jet nozzle.

11. An aircraft, according to claim 10, including an undercarriage having an upright supporting journal, bearing means on said journal rotatably supporting said disc, said body including a closed member rotatably mounted on said journal centrally within a recess of said disc, said body including a peripheral portion extending over the surface of said disc and being spaced slightly thereabove and having vane means thereon, said means for directing air over the surface of said disc directing the air through said vanes for controlling the position of said body in respect to said disc.